(12) United States Patent
Craig

(10) Patent No.: US 6,211,331 B1
(45) Date of Patent: Apr. 3, 2001

(54) POLYMER DEVOLATILIZATION APPARATUS

(75) Inventor: Thomas Orr Craig, Cheshire (GB)

(73) Assignee: Nova Chemicals Europe Limited (GB)

( * ) Notice: Subject to any disclaimer, the term of this patent is extended or adjusted under 35 U.S.C. 154(b) by 0 days.

(21) Appl. No.: 09/641,368

(22) Filed: Aug. 18, 2000

(30) Foreign Application Priority Data

Sep. 9, 1999 (GB) .................................................. 9921259

(51) Int. Cl.$^7$ ................................. C08J 3/00; A01J 17/00
(52) U.S. Cl. ......................... 528/481; 528/491; 528/499; 528/500; 528/501; 528/503; 526/88; 264/85; 425/203; 425/204; 425/207; 425/217
(58) Field of Search ..................................... 528/481, 491, 528/499, 500, 501, 503; 526/88; 264/85; 425/203, 204, 207, 217

(56) References Cited

U.S. PATENT DOCUMENTS 4,356,116 * 10/1982 Beers .................................... 524/837
5,391,664 * 2/1995 Takei et al. ........................... 526/210
5,980,797 * 11/1999 Shelby et al. ........................... 264/85

FOREIGN PATENT DOCUMENTS 880906   10/1961 (GB) .

OTHER PUBLICATIONS

T.O. Craig, Application of an Enhanced Flash–Tank Devolatilization System to a Degassing Extruder, Advances in Polymer Technology, vol. 10, No. 4, 323–325, (1990).

* cited by examiner

Primary Examiner—Samuel A. Acquah
(74) Attorney, Agent, or Firm—Kenneth H. Johnson

(57) ABSTRACT

Devolatilization of molten polymer is carried out using a vertical static mixer which opens directly into a flash tank. Expansion of a stripping agent injected at an inlet of the static mixer occurs in the static mixer and the continued shearing causes disengagement of the vapor from the polymer, so that expansion is complete before the polymer enters the flash tank and stripper and volatiles are removed by a pump and condenser arrangement which holds the flash tank at a reduced pressure. Polymer outlets are in the floor of the flash tank and have metering pumps at their bottom end.

10 Claims, 1 Drawing Sheet

POLYMER DEVOLATILIZATION APPARATUS

FIELD OF THE INVENTION

This invention relates to an apparatus and method for the devolatilisation of polymers, more particularly to an improved apparatus and method for the removal of volatile impurities from thermoplastic polymers.

BACKGROUND OF THE INVENTION

In the manufacture of a wide variety of polymers it is common for them to contain impurities which are unwanted in final products made from the polymers. Such impurities typically include residual monomer, solvents that may have been used in the preparation of the polymer, and low molecular weight organic species such as dimers, trimers and other oligomers that may have been formed during the polymerization process.

An important area is the preparation of polymers and copolymers of styrene made by a continuous mass polymerization process, in which it is desirable to produce polymer products having a residual styrene monomer content below about 100 ppm and whose content of oligomeric species, e.g. styrene dimer, is also minimized. Such products are useful for the manufacture of food packaging, where migration of residual monomer from the polymer into the food can cause problems of taint, i.e. undesirable odor and/or flavor.

In such continuous mass polymerization processes the devolatilisation operation is frequently carried out in two sequential steps. In the first step the polymer mass containing up to 40% removable volatile material is preheated and fed into a vessel held at reduced pressure (usually called a flash tank). In this first devolatilisation the bulk of the volatile components is removed leaving a residual volatiles content in the polymer that in the case of polystyrene production is typically 500–1000 ppm styrene monomer. Various methods of delivering the preheated mass to the flash tank have been proposed in the existing art. In some cases the preheater takes the form of a shell and tube heat exchanger mounted vertically in the top of the flash tank.

In this arrangement preheated polymer mass exits from the preheater and falls to the base of the flash tank to form a pool of devolatilised polymer which is continuously removed by pumping. To increase the hold-up time of the preheated mass in the flash tank the preheated molten polymer mass may be fed into the flash tank through a horizontal distributor arrangement such as a pipe containing multiple peripheral apertures. These apertures may deliver the polymer mass onto trays or similar devices intended to further increase polymer hold-up and exposure to the reduced pressure environment within the flash tank. The vapors of the volatile components usually pass out from the top of the flash tank and are condensed in an external condenser.

GB-A-880,906 discloses a devolatiliser flash tank arrangement having a conical or dome-like upper surface which is externally cooled to condense and trap higher boiling components (dimers, trimers, etc) from the vapors removed during polystyrene devolatilisation. The objective of the arrangement disclosed in GB-A-880,906 is to obtain a stream of purified styrene vapor from the flash tank that can be condensed and re-used directly in the polymerization process. In one embodiment the preheated polymer mass can be delivered to the flash tank as an upward-flowing stream.

Following a first devolatilisation step in a styrenics mass polymerization process, the residual monomer content of the polymer can be further reduced by a second devolatilisation step in which a small amount of an inert volatile substance known as a stripping agent is admixed with the molten polymer mass. The resulting mixture is then subjected to reduced pressure in a flash tank devolatiliser. The stripping agent may for example consist of water, methanol or a solution of carbon dioxide in water. The stripping agent is admixed into the molten polymer by means such as a static mixer, which disperses the stripping agent finely throughout the polymer mass. Exposure of the polymer mass-stripping agent dispersion to reduced pressure subsequently creates bubbles within the mass. The resultant increase in mass surface area (foaming) enhances the rate of removal of residual monomer from the polymer. Typically 1–2 parts by weight of water per hundred parts of polymer are used as the stripping agent in such second-stage flash tank devolatilisation of polystyrene. The water is injected into the flowing molten polymer mass at the inlet of the static mixer and is typically dispersed therein as liquid droplets of about 5 micrometers diameter. At typical flash tank pressures of $10–15 \times 10^2$ Pa these droplets can be envisaged as subsequently undergoing a hundredfold increase in diameter due to vaporization.

The molten polymer foam thus generated could theoretically have a specific volume of the order of 1–2 $m^3$/kg of polymer. For comparison the specific volume of the polymer per se would be 0.001 $m^3$/kg. Foam generation and mass volume expansion on such a scale could not be accommodated in any known practical devolatilisation equipment, and in fact such expansions are not reached.

An example of a known polymer devolatilisation apparatus using a static mixer is that disclosed by Craig in Advances in Polymer Technology, Volume 10, No. 4 (1990), Pages 323–325. The static mixer feeds to a distributor of a falling-strand flash tank.

There remains a need for an apparatus and method which provides the full beneficial devolatilisation effects of stripping agent expansion while avoiding the generation, especially in the flash tank, of undesirably large foam volumes of the polymer mass.

SUMMARY OF THE INVENTION

In a first aspect the present invention provides apparatus for devolatilisation of a polymer, particularly a thermoplastic polymer, the apparatus comprising:

(a) static mixer means for receiving an upward flow of molten polymer;

(b) injection means for charging a stripping agent into the molten polymer at an inlet end of the static mixer means; and (c) a flash tank held at a pressure which is less than atmospheric pressure (preferably between about 133 and 4000 Pa) and having an inlet for receiving a flow of molten polymer-stripping agent mixture from the static mixture means and at least one outlet for removal of devolatilised polymer therefrom, characterized in that an outlet end of the static mixer opens directly into the flash tank.

In a second aspect the present invention provides a method of devolatilising a polymer, particularly a thermoplastic polymer, comprising:

(i) charging molten polymer under pressure into an inlet end of a static mixer;

(ii) charging a stripping agent into the molten polymer under pressure;

(iii) passing a flow of the molten polymer-stripping agent mixture upwardly through the static mixer to experience progressively decreasing pressure to an outlet of the static mixer which is at a devolatilising pressure; and (iv) passing the molten polymer-stripping agent mixture from the outlet of the static mixer directly into a flash tank maintained at the devolatilisation pressure.

DETAILED DESCRIPTION OF THE INVENTION

Figure 1:
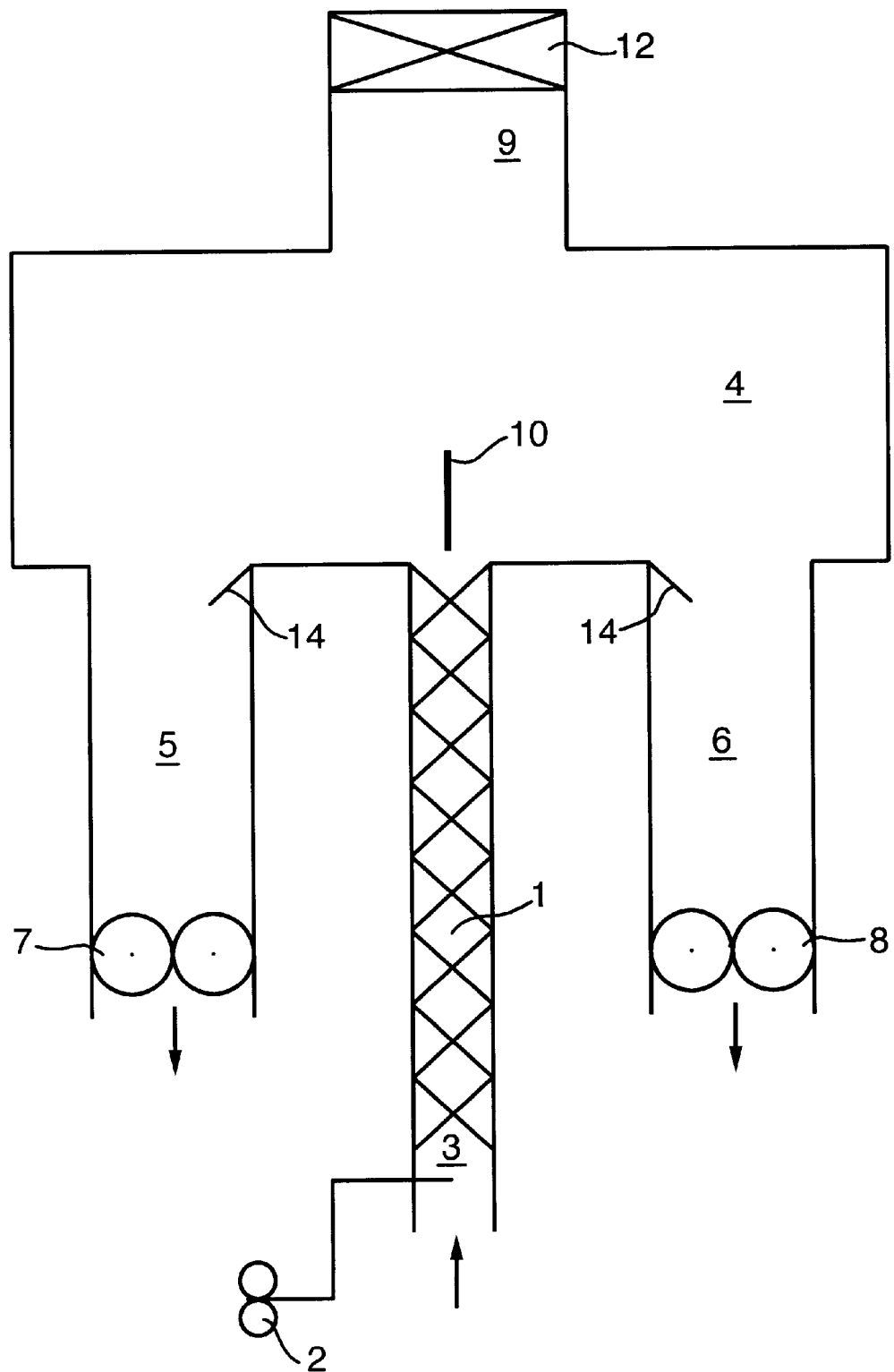
FIG. 1 is a schematic side view representation of the apparatus of the preferred embodiment of the present invention.

Preferably the method of the invention involves allowing the polymer to be further devolatilised in the flash tank and removing the vaporized impurities from the flash tank by condensation. Removing the devolatilised polymer from the vessel is preferably downwardly via at least one outlet.

Fundamentally according to the present invention, the static mixer allows an at least partial expansion of the polymer-stripping agent mixture (and hence an acceleration of flow) as it passes upwardly through the mixer and then a passage of the molten polymer-stripping agent mixture directly, that is, without constraint, into the flash tank where the removal of volatiles and of stripping agent takes place. This provides an unexpectedly beneficial balance between the creation of foam in the polymer mass and the rupture of the foam bubbles that creates a flashing two-phase system. In other words, we have found that a beneficial secondary devolatilisation regime exists when a stripping agent, particularly aqueous, is dispersed into molten polystyrene flowing upwardly in a static mixer that is connected directly to a flash tank in which a reduced pressure is maintained and into which the effluent from the static mixer can freely accelerate. Free upward volumetrically-expanded flow over the static mixer elements increases the relative velocity (slip) between the stripping agent vapor phase and the molten polymer phase as bubbles of vapor coalesce and rise as accelerating slugs or channels in the polymer. This causes deformation of the myriad polymer-vapor interfaces by shearing and stretching them until the vapor disengages totally at the outlet of the mixer. This shearing and especially stretching of the polymer/vapor interface is believed to enhance mass transfer of monomer, from the polymer. Also, there is little or no foam generation beyond that degree necessary for efficient devolatilisation.

In the invention the static mixer may be of any suitable known type already used in the present art, as may be the flash tank which is held at a sub-atmospheric pressure, for example typically in the range of from 133 to 4000 Pa. Typically the tank will be held at a pressure of about 2700 Pa.

Typically the temperature of the process, and thus of the molten polymer, will be in the range of 200 to 300° C., preferably from 220 to 270° C.

The stripping agent may be any stripping agent known in the present art and may for example be water, $C_{1-4}$ alkanols including methanol or, particularly, a solution of carbon dioxide in water. Use of the latter stripping agent is taught in our co-pending European patent application no. 00301578.1.

The apparatus of this invention is applicable particularly to the devolatilisation of polymers and copolymers of styrene. Such polymers commonly have residual monomer contents which require lowering in order to be suitable for many practical applications.

Typically the polymer melt is a melt of one or more polymers selected from the group of polymers including polystyrene, high impact polystyrene (HIPS), styrene acrylonitrile polymers (SAN), acrylonitrile butadiene styrene polymers (ABS), styrene methyl methacrylate polymers, styrene maleic anhydride polymers (SMA), and butadiene styrene methylmethacrylate polymers (MBS), and one or more of the aforesaid polymers, most preferably high impact polystyrene blended with polyphenylene oxide. However, the present invention could be used in association with other polymers such as polyamides (e.g. nylons) and aromatic polyesters such as polyethylene terephthalate and polybutylene terephthalate.

Generally, the polymers which may be treated in accordance with the present invention comprise:

(i) from 100 to 30, preferably from 100 to 50, most preferably from 100 to 70 weight % of one or more monomers selected from the group consisting of $C_{8-12}$ vinyl aromatic monomers which are unsubstituted or substituted by a $C_{1-4}$ alkyl radical; and (ii) from 0 to 70, preferably 0 to 50, most preferably from 0 to 30 weight % of one or more monomers selected from the group consisting of $C_{1-4}$ alkyl esters of acrylic or methacrylic acid; acrylonitrile and methacrylonitrile; and in the case of the most preferred range maleic anhydride (i.e. SMA polymers typically comprise from 5 to 25, preferably from 5 to 15 weight % of maleic anhydride and the balance one or more of the above vinyl aromatic monomers, most preferably styrene); which polymers may be grafted on to from 0 to 40, preferably from 0 to 20 weight % of one or more rubbery polymers selected from the group consisting of one or more $C_{4-6}$ conjugated diolefin monomers and polymers comprising from 20 to 80, preferably from 40 to 60 weight % of one or more $C_{8-12}$ vinyl aromatic monomers and from 80 to 20, preferably from 60 to 40 weight % of one or more $C_{4-6}$ conjugated diolefins.

Suitable vinyl aromatic monomers include styrene, alpha-methyl styrene, and p-methyl styrene. Suitable esters of acrylic or methacrylic acid include methyl methacrylate, ethyl methacrylate, methyl acrylate, ethyl acrylate, and butyl acrylate. Suitable conjugated diolefin monomers include butadiene and isoprene. Most preferably the polymer melt is polystyrene or high impact polystyrene (HIPS).

The present invention has been described in terms of the devolatilisation of a polymer melt of polystyrene. However, the present invention may also be used in association with melts of other polymers such as acrylonitrile butadiene styrene polymers (ABS), styrene acrylonitrile polymers (SAN), styrene maleic anhydride (SMA) and polymer blends. The present invention is particularly useful where polymers are solution blended. That is, miscible solutions of two polymers are mixed and the solvent(s) is/are removed. In such cases, it is often desirable to remove the solvent(s) to as low a level as possible.

One commercially available blend in which the present invention may be useful is a blend of polyphenylene oxide and polystyrene or a blend of polyphenyleneoxide and high impact polystyrene. Typically, the weight ratio of polystyrene to polyphenylene oxide is from 90:10 to 10:90, preferably from 70:30 to 10:90.

In the second stage devolatilisation of polymers such as polystyrene it is important to minimize the residence time of the polymer in the flash tank. This is because the polymer can depolymerize and if not suppressed this mechanism can override the effects of second stage devolatilisation. Accordingly, a further advantage of the apparatus of the present invention, where the molten polymer-stripping agent mixture is delivered from the static mixer directly into the flash tank, is that the polymer residence time is reduced in relation to prior art static devolatilisation equipment. More specifically, the apparatus of the invention provides a reduced polymer mass residence time coupled with a uniform residence time distribution. The latter feature is beneficial where more than one pump is used (as is preferred in the invention) to remove the polymer mass from the flash tank in such a second stage devolatilisation step. In a preferred embodiment the apparatus comprises at least two such outlets from the flash tank, each of which is provided with a pump and together enable the residence time of the polymer within the flash tank to be minimized.

In order to assist the direction of polymer within the flash tank from its inlet directly from the static mixer towards the (preferably) plurality of outlets, there may conveniently be provided chute means or some such similarly constructed and/or acting tray means to deliver the polymer mass from the flash tank inlet to the region(s) of the outlet(s). This may further be assisted by the provision for example of one or more baffles or dividing plates in the region of the flash tank inlet.

A preferred embodiment of the apparatus of the present invention will now be described in detail, with reference to the accompanying drawing, in which the sole Figure is a schematic side view representation of the apparatus of the preferred embodiment.

Molten polystyrene is pumped under high pressure (e.g. $1–6\times10^4$ kPa, preferably $2–4\times10^4$ kPa) into an inlet end of a vertical static mixer 1, which is of a conventional type. Any first-stage devolatilisation step known in the art may have been applied to the polymer, or none. A liquid stripping agent, for example water or a solution of carbon dioxide in water, is metered at high pressure near or at the inlet end of the static mixer via pump 2 and injection device 3. The upper, outlet, end of the static mixer 1 is connected directly into horizontal cylindrical reduced pressure flash tank 4 with the final mixer unit at that end. The tank 4 is typically held at the sub-atmospheric pressure of 2667 Pa. A dividing plate 10 is arranged in the region of the exit of the static mixer in order to divide the flow of polymer mass exiting freely therefrom. Flowing polymer mass passes from the static mixer exit over the floor of the tank to each of the vertical cylindrical outlet chambers 5, 6, in which are mounted gear pumps 7, 8 for the purpose of metering the devolatilised polymer downwardly out of the apparatus for further processing.

The flash tank 4 is connected via conduit 9 to a suitable combination of condensing and vacuum-creating means 12 which remove the vaporized stripping agent, together with the unwanted volatiles present in the original polymer, where they are condensed and removed from the system.

The entrances to each of the outlet chambers 5, 6 are bounded by flanges, trays or chute-like elements 14 which direct the flowing devolatilising polymer mass from the exit of the static mixer into each of the outlet chambers, in order to assist reduction of the residence time of the polymer within the tank 4.

In operation, as the molten polymer-stripping agent mixture flows upwardly in the mixer 1 an intimate mix of liquid agent and polymer is first formed but progressively the pressure on the mixture decreases so that the stripping agent vaporizes and expands. By the time the mixture reaches the outlet of the mixer 1 the pressure exerted on it is that of the flash tank 4, and the foaming process should be effectively complete. The expansion which is involved implies also a progressive acceleration of the flow upwardly such that the effect of the static mixer is accentuated. For the reasons explained above, vapor disengagement from the polymer should be substantially complete by the time the accelerated flow passes freely into the flash tank so that there is little further expansion in that tank, hence the efficiency of the devolatilisation in the flash tank is increased while the residence time in that tank can be minimized.

What is claimed is:

1. Apparatus for devolatilisation of a molten polymer comprising:
   (a) static mixer means for receiving an upward flow of molten polymer;
   (b) injection means for charging a stripping agent into the molten polymer at an inlet end of the static mixer means; and
   (c) a flash tank having an inlet for receiving a flow of molten polymer-stripping agent mixture from the static mixture means and at least one outlet for removal of devolatilised polymer therefrom, characterized in that an outlet end of the static mixer opens directly into the flash tank.

2. Apparatus according to claim 1, wherein the static mixer is vertical.

3. Apparatus according to claim 2, wherein the flash tank has at least one outlet in its floor for downward discharge of devolatilised polymer.

4. Apparatus according to claim 3, wherein each outlet has a gear pump for metering the discharge.

5. Apparatus according to claim 4, wherein mixer units of the static mixer continue to its outlet end.

6. A method of devolatilising a polymer comprising:
   (i) charging molten polymer under pressure into an inlet end of a static mixer
   (ii) charging a stripping agent into the molten polymer under pressure;
   (iii) passing a flow of the molten polymer-stripping agent mixture upwardly through the static mixer to experience progressively decreasing pressure to an outlet of the static mixer which is at a devolatilising pressure; and
   (iv) passing the molten polymer-stripping agent mixture from the outlet of the static mixer directly into a flash tank maintained at the devolatilisation pressure.

7. A method according to claim 6, wherein the polymer passes over a floor of the tank to at least one downward outlet flow.

8. A method according to claim 7, wherein the flash tank is held at a pressure between 133 and 4000 Pa.

9. A method according to claim 8, wherein the pressure is about 2700 Pa.

10. A method according to claim 9, wherein the temperature of the polymer is 220 to 270° C.

* * * * *